US009848481B2

(12) United States Patent
Ando

(10) Patent No.: US 9,848,481 B2
(45) Date of Patent: Dec. 19, 2017

(54) RADIO-CONTROLLED LIGHTING SYSTEM, RADIO DEVICE, AND REGISTRATION METHOD

(71) Applicant: Panasonic Intellectual Property Management Co., Ltd., Osaka (JP)

(72) Inventor: Tamotsu Ando, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/367,685

(22) Filed: Dec. 2, 2016

(65) Prior Publication Data

US 2017/0164455 A1 Jun. 8, 2017

(30) Foreign Application Priority Data

Dec. 7, 2015 (JP) .................................. 2015-238991

(51) Int. Cl.

| H05B 37/02 | (2006.01) |
| H05B 39/08 | (2006.01) |
| H04W 4/02 | (2009.01) |
| H04B 17/318 | (2015.01) |
| H04W 40/22 | (2009.01) |
| H04W 60/04 | (2009.01) |
| G06F 3/0488 | (2013.01) |

(52) U.S. Cl.
CPC ....... *H05B 37/0272* (2013.01); *H04B 17/318* (2015.01); *H04W 40/22* (2013.01); *H04W 60/04* (2013.01); *G06F 3/0488* (2013.01)

(58) Field of Classification Search
None
See application file for complete search history.

(56) References Cited

U.S. PATENT DOCUMENTS

| 9,578,722 B2 * | 2/2017 | Feng | ................... G08C 17/02 |
| 2014/0015415 A1 * | 1/2014 | Lim | ................... H05B 37/02 315/131 |
| 2015/0366035 A1 * | 12/2015 | Baek | ................... H05B 37/0272 315/131 |

FOREIGN PATENT DOCUMENTS

| JP | 5-41288 A | 2/1993 |
| JP | 2002-343581 A | 11/2002 |
| JP | 2006-093098 A | 4/2006 |

(Continued)

*Primary Examiner* — Dedei K Hammond
(74) *Attorney, Agent, or Firm* — McDermott Will & Emery LLP

(57) ABSTRACT

A radio-controlled lighting system includes: lighting devices each having a radio communication circuit; and a radio device which controls the lighting devices via radio communications. The radio device includes: an obtainer which obtains, for each of the lighting devices, variation information indicating variation in a received signal strength at either one of the radio device and a corresponding one of the lighting devices; a judging component which judges whether or not the variation indicated in the variation information satisfies a predetermined condition; a determiner which determines one or more of the lighting devices to be one or more of registration candidates when the judging component judges that the variation satisfies the predetermined condition; and a register which registers, as a target lighting device to be controlled, one of the lighting devices which is selected from the registration candidates.

14 Claims, 12 Drawing Sheets

(56) References Cited

FOREIGN PATENT DOCUMENTS

| JP | 2010-103056 A | 5/2010 |
| JP | 2012-089276 A | 5/2012 |
| JP | 2015-097211 A | 5/2015 |

* cited by examiner

FIG. 6
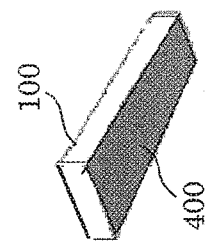
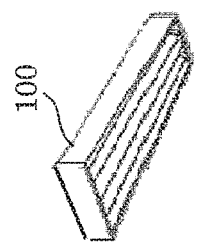

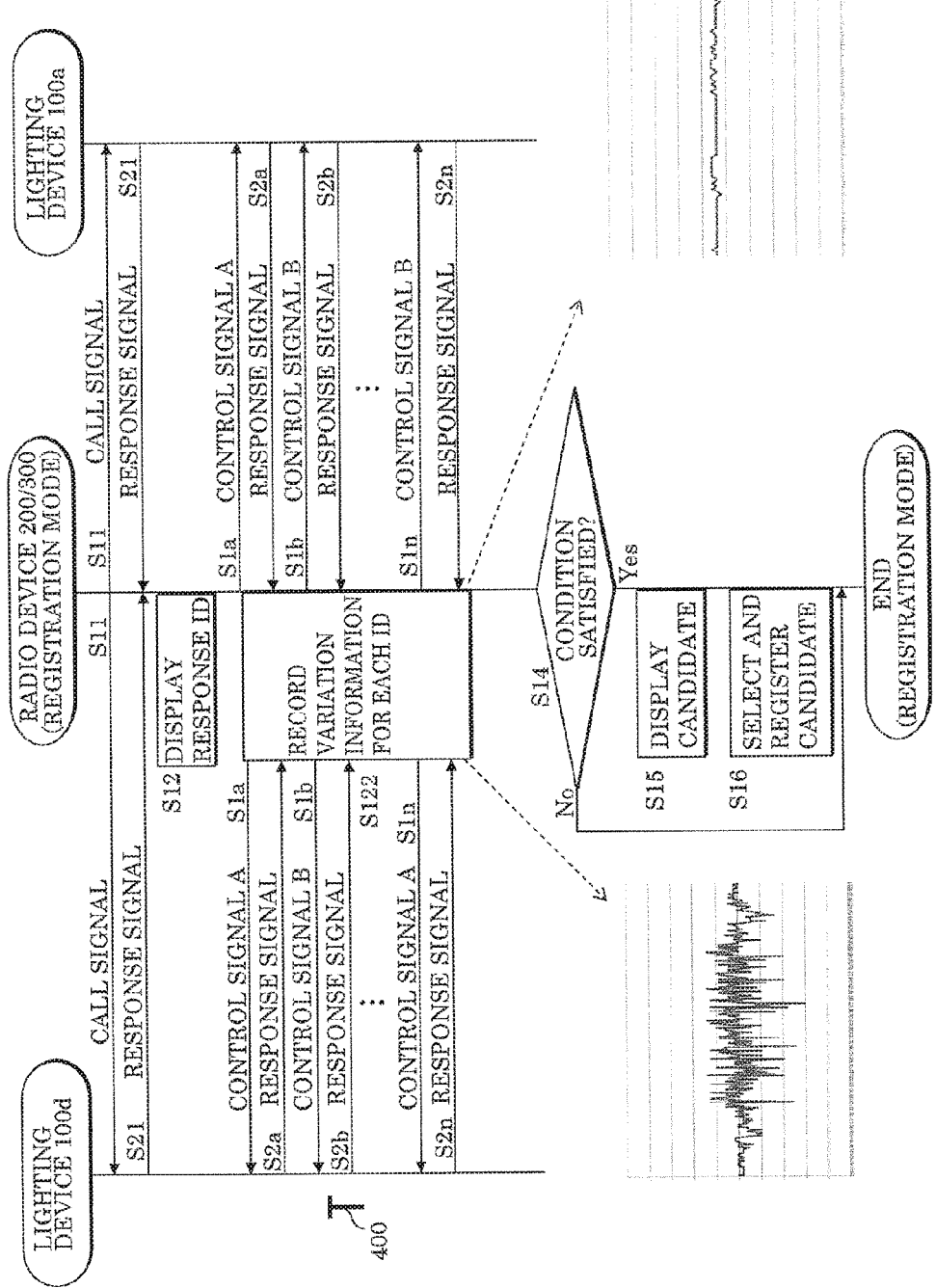

RADIO-CONTROLLED LIGHTING SYSTEM, RADIO DEVICE, AND REGISTRATION METHOD

CROSS REFERENCE TO RELATED APPLICATION

This application claims the benefit of priority of Japanese Patent Application Number 2015-238991 filed on Dec. 7, 2015, the entire content of which is hereby incorporated by reference.

BACKGROUND

1. Technical Field

The present disclosure relates to a lighting device having a radio communication function, a radio device which controls the lighting device via the radio communication, and a registration method for the lighting device.

2. Description of the Related Art

For example, Japanese Unexamined Patent Application Publications No. 2002-343581, No. 2006-93098, and No. 2012-89276 each disclose a lighting device having a radio communication function and a radio device which controls the lighting device via the radio communication.

In addition, Japanese Unexamined Patent Application Publications No. 2015-97211 discloses, in order to easily register a lighting device to be controlled, a lighting control device registers a lighting device according to a received signal strength of the lighting device, and controls the lighting device which has been registered.

SUMMARY

However, according to Japanese Unexamined Patent Application Publications No. 2015-97211, in the case where, for example, a lighting device to be controlled has a received signal strength lower than a received signal strength of another lighting device, there is a possibility that the other lighting device is erroneously registered.

An object of the present disclosure is to provide a radio-controlled lighting system, a radio device, and a registration method, which reduce erroneous registration when registering a lighting device to be controlled.

In order to achieve the above-described object, a radio-controlled lighting system according to an aspect of the present disclosure includes: a plurality of lighting devices each having a radio communication circuit; and a radio device which controls the plurality of lighting devices via radio communications, wherein the radio device includes: an obtainer which obtains, for each of the plurality of lighting devices, variation information indicating variation in a received signal strength at either one of the radio device and a corresponding one of the plurality of lighting devices, in a particular radio communication mode between the plurality of lighting devices and the radio device; a judging component which judges whether or not the variation indicated in the variation information satisfies a predetermined condition; a determiner which determines one or more of the plurality of lighting devices to be one or more registration candidates when the judging component judges that the variation satisfies the predetermined condition; and a register which registers, as a target lighting device to be controlled, one of the plurality of lighting devices which is selected from the registration candidates.

In addition, a radio device according to an aspect of the present disclosure is a radio device which controls a plurality of lighting devices via radio communications. The radio device includes: an obtainer which obtains, for each of the plurality of lighting devices, variation information indicating variation in a received signal strength at either one of the radio device and a corresponding one of the plurality of lighting devices, in a particular radio communication mode between the plurality of lighting devices and the radio device; judging component which judges whether or not the variation indicated in the variation information satisfies a predetermined condition; a determiner which determines one or more of the plurality of lighting devices to be one or more registration candidates when the judging component judges that the variation satisfies the predetermined condition; and a register which registers, as a target lighting device to be controlled, one of the plurality of lighting devices which is selected from the registration candidates.

In addition, a registration method according to an aspect of the present disclosure is a method of registering, on a radio device, a lighting device to be controlled The method includes: obtaining, for each of a plurality of lighting devices including the lighting device to be controlled, variation information indicating variation in a received signal strength at either one of the radio device and a corresponding one of the plurality of lighting devices, in a particular radio communication mode between the plurality of lighting devices and the radio device; judging whether or not the variation indicated in the variation information satisfies a predetermined condition; determining one or more of the plurality of lighting devices to be one or more registration candidates when it is judged that the variation satisfies the predetermined condition; and registering, as a target lighting device to be controlled, one of the plurality of lighting devices which is selected from the registration candidates.

With the radio-controlled lighting system, the radio device, and the registration method according to the present disclosure, it is possible to reduce erroneous registration when a lighting device to be controlled is registered.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 6 is a diagram illustrating another example of a disturbance component;

FIG. 12 is a sequence diagram illustrating a modification example of Embodiment 2.

DETAILED DESCRIPTION OF THE EMBODIMENTS

The following describes in detail embodiments according to the present disclosure, with reference to the drawings. It should be noted that each of the embodiments explained below describes a specific example of the present disclosure. The numerical values, shapes, materials, structural components, the disposition and connection of the structural components, steps, the processing order of the steps, etc. described in the following embodiments are mere examples, and do not intend to limit the present disclosure. Furthermore, among the structural components in the following embodiments, structural components not recited in any one of the independent claims which indicate the broadest concepts of the present disclosure are described as arbitrary structural components. Moreover, each diagram is a schematic diagram and not necessarily strictly illustrated.

Embodiment 1

1.1 A CONFIGURATION EXAMPLE OF A LIGHTING SYSTEM

First, the following describes a configuration example of a lighting system according to Embodiment 1.

Figure 1:
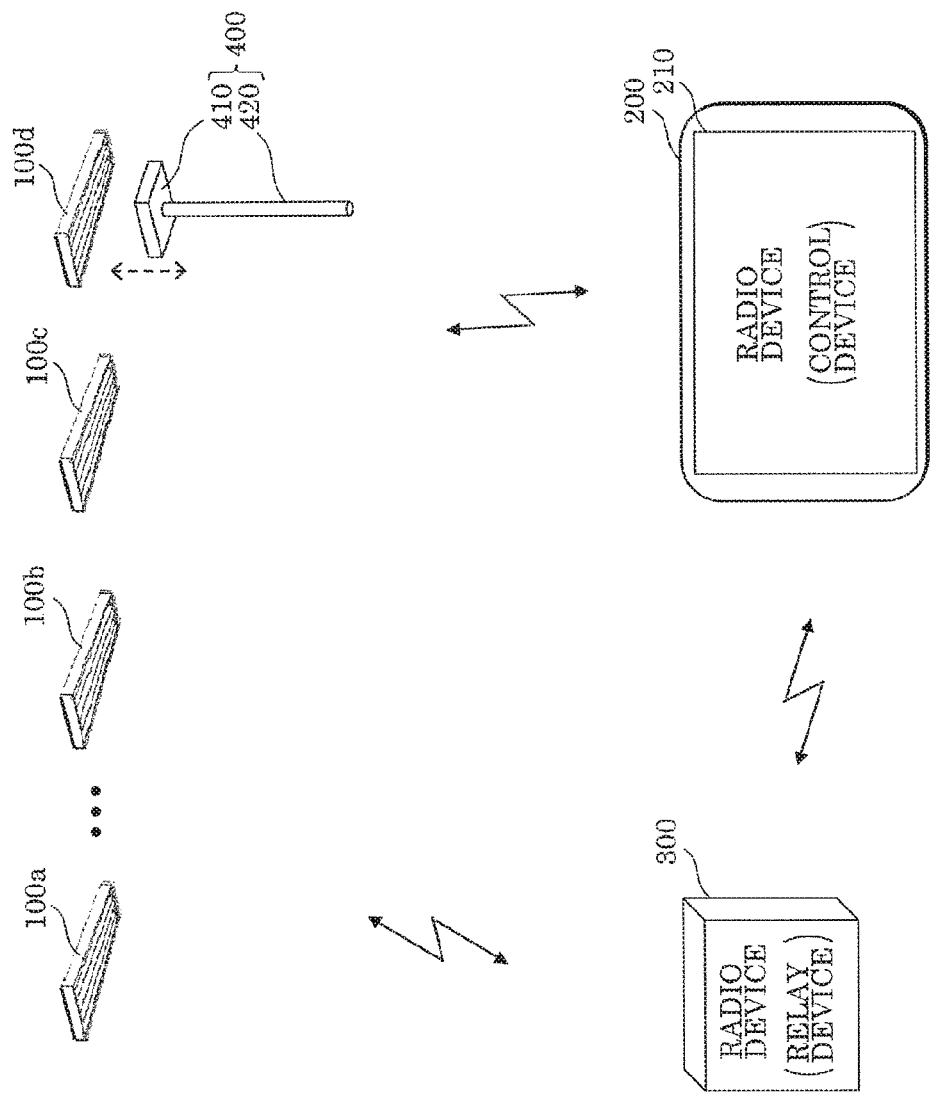
FIG. 1 is a diagram illustrating a configuration example of a radio-controlled lighting system according to Embodiment 1.

FIG. 1 is a diagram illustrating a configuration example of a radio-controlled lighting system according to Embodiment 1. The radio-controlled lighting system illustrated in the diagram includes a plurality of lighting devices 100a to 100d, radio device 200, radio device 300, and disturbance component 400.

First, disturbance component 400 shall be described. Disturbance component 400 includes planar component 410 having a radio reflector or a radio absorber, and shaft 420 attached to planar component 410.

Planar component 410 may be, for example, a plate covered by a conductive sheet such as aluminum foil, and serves as the radio reflector. Alternatively, planar component 410 may be, for example, a plate including a magnetic body such as ferrite, and serves as the radio absorber.

Shaft 420 is a handle which a user or an installation worker grabs, and used for disturbing radio waves of lighting device 100, by moving disturbance component 400 closer to or away from lighting device 100 in the case where an ID of lighting device 100 is registered on radio device 200. Disturbing radio waves, here, refers to varying an electric field strength of a received signal of lighting device 100 and a transmitted signal from lighting device 100.

Disturbance component 400 is used as described below, in the case where an ID of lighting device 100 is registered on radio device 200. A user or an installation worker moves disturbance component 400 closer to or away from lighting device 100 to be controlled, thereby disturbing radio waves between lighting device 100 and radio device 200. As a result, the received signal strength of lighting device 100 or the received signal strength of radio device 200 which receives a radio signal from lighting device 100 varies. Radio device 200, in the case where an ID of lighting device 100 is registered, distinguishes lighting device 100 to be controlled from other lighting devices 100, according to the presence or absence of artificially caused variation, or whether or not variation satisfies a condition.

The number of lighting devices 100a to 100d may be arbitrarily determined, and lighting devices 100a to 100d may have the same configurations with the exception that lighting devices 100a to 100d each have individual identifier (ID). In the case where it is not necessary to distinguish between lighting devices 100a to 100d, lighting devices 100a to 100d are referred to representatively as lighting device 100. Lighting device 100 has a radio communication function, and is controlled by radio device 200 or radio device 300 via radio communication. Lighting device 100 responds to a radio signal including an ID of lighting device 100 itself, and a radio signal including a broadcast address.

Radio device 200 is a control device for controlling lighting device 100 via radio communications by a user, that is, a radio remote controller, and, for example, is a terminal device such as a tablet terminal device or a smartphone-type terminal device. Radio device 200 is capable of individually controlling lighting device 100, by including into a radio signal the ID of lighting device 100 to be controlled as an address. In addition, radio device 200 is capable of causing lighting device 100 located within a reachable range of a radio wave to receive a radio signal, by including into the radio signal the broadcast address.

Here, the method of registering, by radio device 200, lighting device 100 to be controlled shall be briefly described. Radio device 200 obtains, for each of lighting devices 100, variation information which indicates variation of a received signal strength of lighting device 100 or radio device 200 in a particular radio communication mode (referred to as a registration mode) between lighting device 100 and radio device 200, determines the lighting device as one of registration candidates when the variation indicated in the variation information satisfies a predetermined condition, and registers a lighting device selected from among the registration candidates as the lighting device to be controlled.

Radio device 300 is a relay device which relays a radio signal between radio device 200 and lighting device 100. The ID of lighting device 100 to be a target of relaying may be registered on radio device 300 in advance. In this case, registration of the ID on radio device 300 may be carried out in the same manner as described above. More specifically, radio device 300 obtains, for each of lighting devices 100, variation information which indicates variation of a received signal strength of lighting device 100 or radio device 300 in a particular radio communication mode (referred to as a registration mode) between lighting device 100 and radio device 300, determines the lighting device as one of registration candidates when the variation indicated in the variation information satisfies a predetermined condition, and registers a lighting device selected from among the registration candidates as the lighting device to be controlled.

1.2 A CONFIGURATION EXAMPLE OF THE LIGHTING DEVICE AND THE RADIO DEVICE

Next, more detailed configurations of lighting device 100 and radio devices 200 and 300 shall be described.

Figure 2:
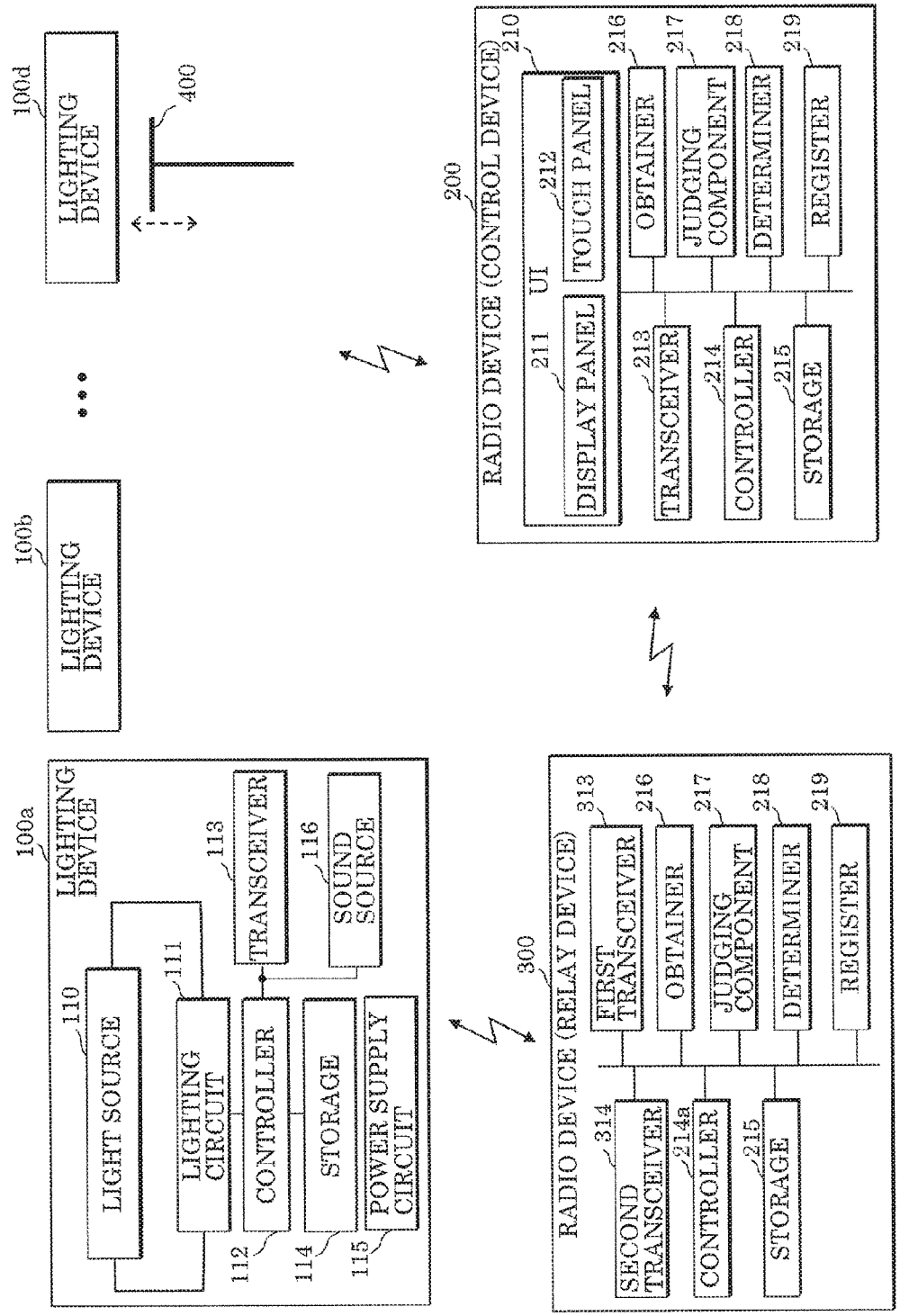
FIG. 2 is a block diagram illustrating a configuration example of the radio-controlled lighting system according to Embodiment 1.

FIG. 2 is a block diagram illustrating a configuration example of the radio-controlled lighting system according to Embodiment 1. As illustrated in FIG. 2, lighting device 100 includes: light source 110; lighting circuit 111; controller 112; transceiver 113; storage 114; power supply circuit 115; and sound source 116.

Light source 110 includes at least one light-emitting element. The at least one light-emitting element is, for example, a plurality of light-emitting diode (LED) elements. It should be noted that the at least one light-emitting element is not limited to the LED element. Light source 110 may include, for example, a semiconductor light-emitting element such as a semiconductor laser, or a solid-state light-emitting element such as an organic electro luminescence (EL) and an inorganic EL. Light source 110 may have a straight-tube shape or a ring shape, or may be a downlight.

Lighting circuit 111 supplies light source 110 with a voltage or current for lighting, blinking, turning off, etc., of light source 110. The voltage or current differs according to, for example, a lighting mode such as a dimming ratio and a toning ratio when light source 110 includes a plurality of LED elements.

Controller 112 controls lighting circuit 111 according to a plurality of lighting modes. Furthermore, controller 112, in the particular radio communication mode (registration mode), records a received signal strength of a control signal or a call signal transmitted from radio device 300 onto storage 114 as time series data, and transmits the recorded time series data to radio device 300 as variation information of the received signal strength. In addition, controller 112 controls, for example, a dimming function for adjusting brightness, a toning function for adjusting a color temperature, a fading function for adjusting brightness with time, etc. Controller 112 observes the radio signal received from radio device 200 or radio device 300 via transceiver 113.

Transceiver 113 communicates with radio device 200 or radio device 300 using a radio signal. The radio signal includes, for example, a control signal for instructing dimming, toning, etc., or a call signal including a broadcast address.

Storage 114 stores: data indicating a current dimming level; data indicating a current toning level; device information of lighting device 100; a flag or the like that indicates a state; etc. In addition, storage 114 temporarily stores the variation information of each of lighting devices 100 in the particular radio communication mode between lighting device 100 and radio device 200.

Power supply circuit 115 supplies power to each component in lighting device 100.

Sound source 116 includes, for example, a speaker, a buzzer, etc., and outputs a sound.

The following described a configuration example of radio device 200 that is a control device (i.e., radio remote controller).

As illustrated in FIG. 2, radio device 200 includes: user interface (UI) 210; transceiver 213; controller 214; storage 215; obtainer 216; judging component 217, determiner 218; and register 219. For example, radio device 200 may include: a central processing unit (CPU) which is also referred to as a microprocessor, a microcontroller, or a processor; a memory (for example, a semiconductor memory such as a ROM and a RAM); and an input/output (I/O) circuit. In this case, storage 215 may be the memory that stores a program and data. Controller 214, obtainer 216, judging component 217, determiner 218; and register 219 are implemented as a result of the CPU executing the program stored in the memory. UI 210 and transceiver 213 are included in the I/O circuit. A part of all of the CPU, the memory, and the I/O circuit may be an integrated circuit (IC) or an large-scale integration (LSI).

UI 210 includes display panel 211 and touch panel 212, and included in a graphical user interface (GUI) of a touch panel type. Display panel 211 is, for example, a liquid-crystal display panel or an EL panel, and displays, for example, information indicating various operation menu items or states. Touch panel 212 receives a user operation.

Transceiver 213 transmits and receives a radio signal according to control by controller 214.

Controller 214 controls operations of the entirely of radio device 200

Storage 215 stores an ID of lighting device 100 to be controlled. In other words, lighting device 100 to be controlled is registered on storage 215. In addition, storage 215 temporarily stores the variation information of each of lighting devices 100 in the particular radio communication mode between lighting device 100 and radio device 200.

Obtainer 216 obtains, for each of lighting devices 100, variation information indicating variation of a received signal strength of lighting device 100 or radio device 200 in the particular radio communication mode between lighting device 100 and radio device 300. Regarding obtainment of variation information, obtainer 216 may obtain variation information by receiving from lighting device 100, or may obtain variation information by generating in storage 215, as variation information, time series data of a received signal strength of a signal received by transceiver 213 from lighting device 100.

Judging component 217 judges whether or not variation indicated in the variation information obtained by obtainer 216 satisfies a predetermined condition. Here, a predetermined condition relates to a variation range of the received signal strength, and the predetermined condition, for example, may be the variation range being greater than a threshold value or the variation range being greatest among a plurality of lighting devices. In addition, the predetermined condition may relate to the number of times or a cycle of variation.

Determiner 218 determines the lighting device to be a registration candidate when judging component 217 judges that the variation satisfies the predetermined condition. The registration candidate is displayed on UI 210, and register 219 registers, as a lighting device to be controlled, a lighting device selected from among registration candidates, when selection by a user is received. In other words, register 219 causes storage 215 to store an ID of the selected lighting device as an ID indicating a lighting device to be controlled.

Further, an example of a configuration of radio device 300 which is the relay device shall be described.

As illustrated in FIG. 2, radio device 300 includes: first transceiver 313; second transceiver 314; controller 214a; storage 215; obtainer 216; judging component 217; determiner 218; and register 219. In radio device 300, structural components identical to structural components of the configuration example of radio device 200 illustrated in FIG. 2 are assigned with the same reference signs. The following description focuses on the differences.

First transceiver 313 transmits and receives a radio signal with radio device 200.

Second transceiver 314 transmits and receives a radio signal with lighting device 100.

Controller 214a controls operations of the entirely of radio device 300, that is, operations performed by radio device 300 as the relay device. In addition, controller 214a, storage 215, obtainer 216, judging component 217, determiner 218; and register 219 register lighting device 100 to be controlled, as with radio device 200.

1.3 A VARIATION EXAMPLE OF A RECEIVED SIGNAL STRENGTH

Next, variation in a received signal strength caused by disturbance component 400 shall be described.

Figure 3:
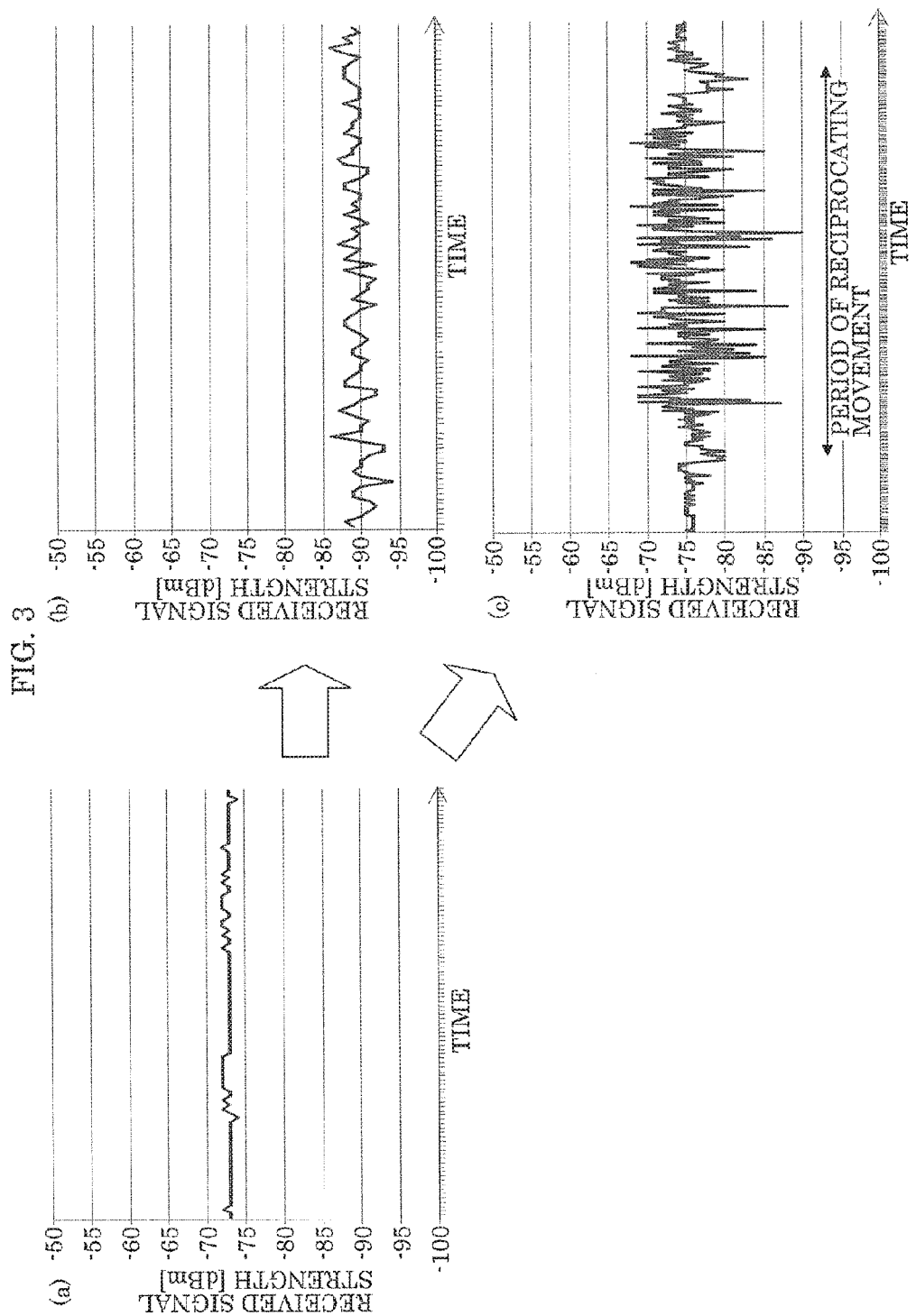
FIG. 3 is a diagram illustrating a received signal strength in radio communications.

FIG. 3 is a diagram illustrating a received signal strength in radio communications. In each of (a), (b), and (c) in the diagram, the horizontal axis indicates time and the vertical axis indicates the received signal strength.

In the diagram, (a) indicates the received signal strength in the state where disturbance component 400 is not close to lighting device 100. In this case, the received signal strength is substantially constant at approximately −73 dBm.

In the diagram, (b) indicates the received signal strength in the state where disturbance component 400 is placed close to lighting device 100. In this case, the received signal strength indicates approximately an average of −90 dBm and this value is lower by approximately 20 dBm than the state indicated by (a).

In the diagram, (c) indicates the received signal strength in the state where reciprocating movement of moving disturbance component 400 closer to and away from lighting device 100 is repeated. In this case, the received signal strength varies between approximately −70 dBm and approximately −90 dBm during reciprocating movement of moving disturbance component 400.

In this example, the above-described predetermined condition may be a signal strength variation range of 15 or 10 (dBm), for example, and lighting device 100 corresponding to (c) is determined to be a subject of the reciprocating movement of disturbance component 400.

1.4 A DISPLAY EXAMPLE OF THE UI

The following describes a display example of UI 210 in a particular radio communication mode (i.e., registration mode).

Figure 4:
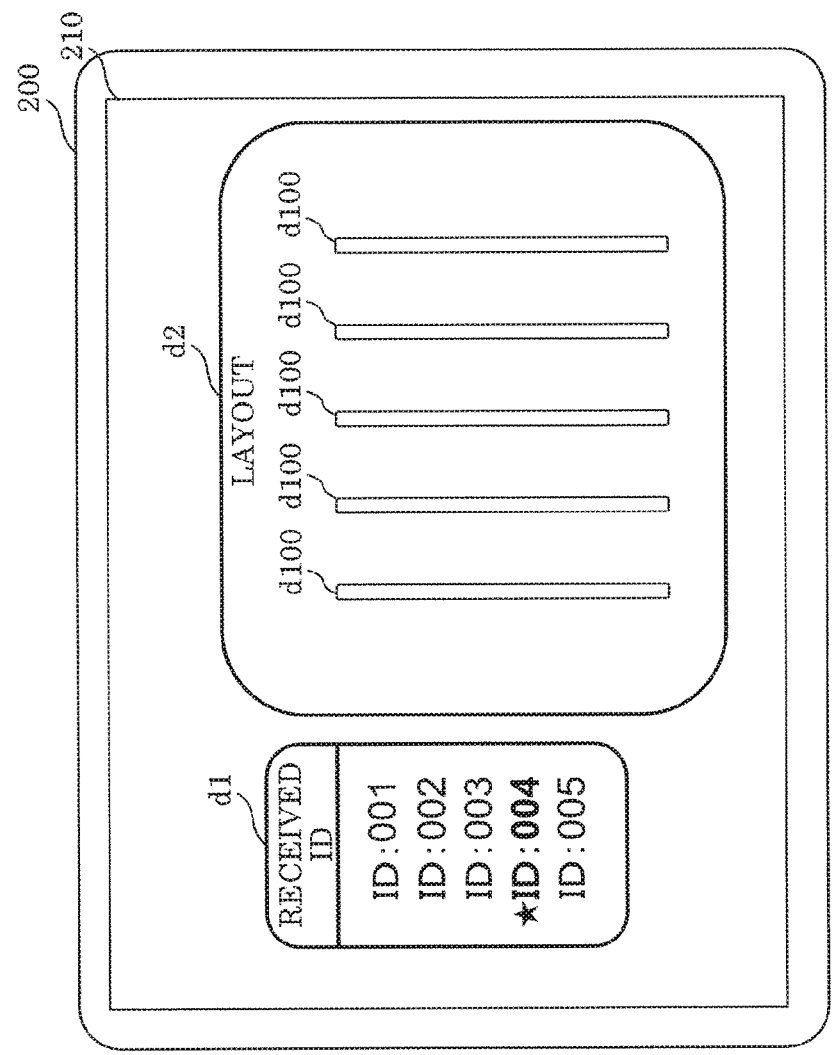
FIG. 4 is a diagram illustrating a display example of a user interface (UI)

FIG. 4 is a diagram illustrating a display example of UI 210. This diagram shows UI 210 in which display box d1 and display box d2 are displayed.

In display box d1, a list of IDs of lighting devices 100 which responded to call signals in the registration mode is indicated. In the list of the IDs, five IDs, "001" to "005", are displayed. It is indicated that ID "004" to which a star mark is attached among these IDs is a registration candidate of which variation information satisfies the predetermined condition. In other words, it is indicated that there was position variation such as reciprocating movement of disturbance component 400 with respect to lighting device 100.

In display box d2, a layout of lighting devices 100 arranged on a ceiling in proximity to radio device 200 is indicated. In this diagram, five icons d100 each indicate different one of lighting devices 100. For example, in the case where reciprocating movement of disturbance component 400 was performed with respect to lighting device 100 corresponding to rightmost icon d100, it is indicated that the ID of lighting device 100 at the rightmost position is "004". In this display example, for example, by tapping the rightmost icon d100 in display box d2, ID "004" is registered in association with lighting device 100 which corresponds to the rightmost icon d100. In this manner, by varying the position of disturbance component 400 in proximity to lighting device 100 to be controlled, it is possible to register lighting device 100 to be controlled and to significantly reduce the possibility of erroneously registering other lighting devices 100.

1.5 AN OPERATION EXAMPLE OF REGISTRATION

Next, an operation example of registration shall be described in more detail.

Figure 5:
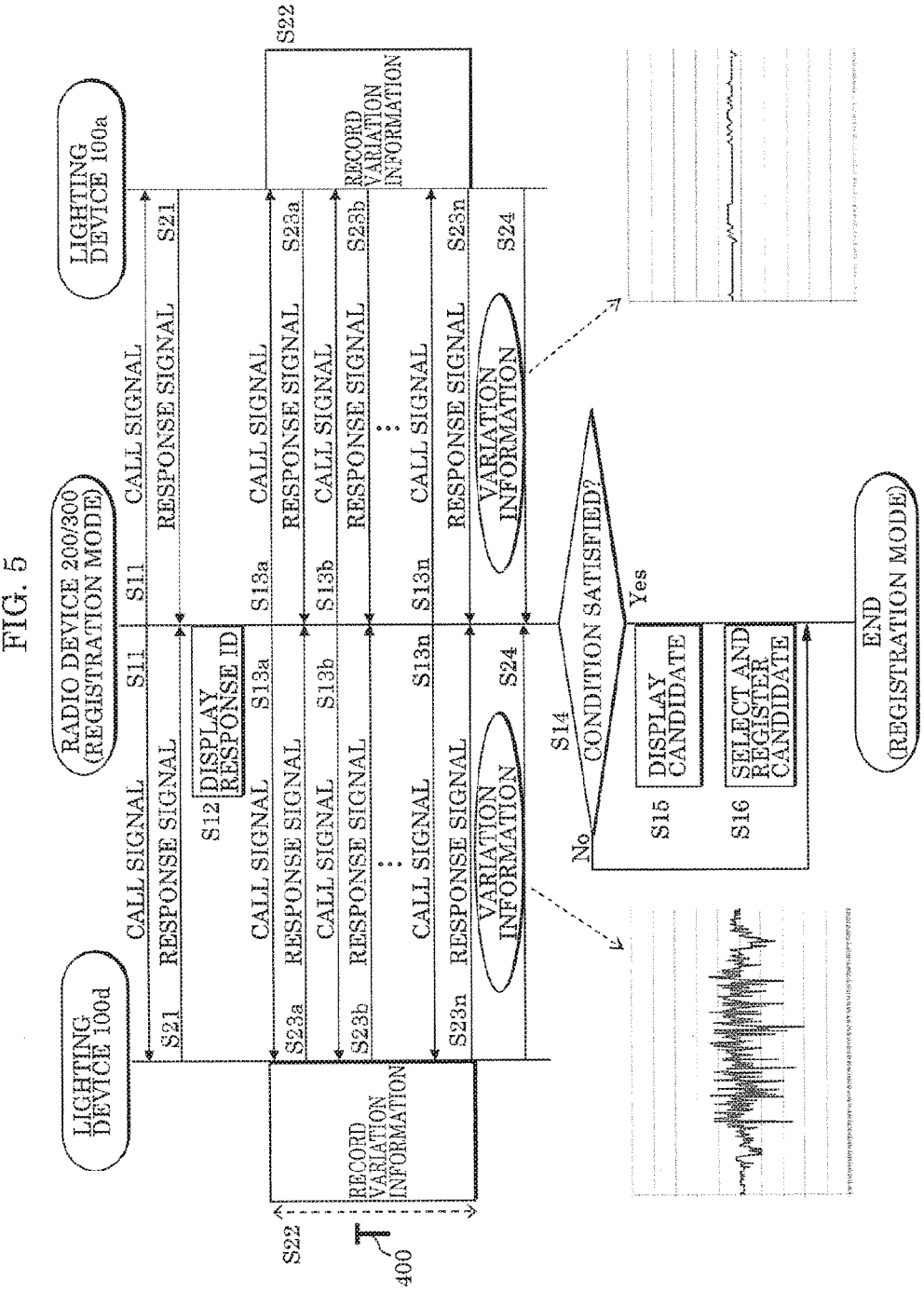
FIG. 5 is a sequence diagram illustrating a processing example in a registration mode.

FIG. 5 is a sequence diagram illustrating a processing example in a registration mode. In this diagram, radio device 200 or 300, and two lighting devices 100a and 100d are representatively illustrated. Radio device 200 and radio device 300 are each capable of performing the processing illustrated in the diagram. In the following description, radio device 200/300 in the diagram is representatively referred to as radio device 200, for convenience.

In this diagram, radio device 200 first transmits a call signal including a broadcast address (S11). The call signal is a signal for calling lighting device 100 which is present in proximity, and requires returning of an ID. In addition, the call signal may include an instruction for shifting to the registration mode. In response to the call signal, lighting devices 100d and 100a transmit response signals each including an ID.

Radio device 200 displays, on UI 210, the IDs of lighting devices 100a and 100d which have transmitted responses.

Next, radio device 200 transmits a call signal repeatedly for a predetermined period of time, to lighting devices 100a and 100d which have transmitted responses (S13a to S13n).

During the predetermined period of time, a user or a installation worker continues to vary the position of disturbance component 400 in close proximity to lighting device 100d, instead of lighting device 100a, thereby disturbing radio waves.

In response to the call signal, lighting devices 100a and 100d each transmit a response signal (S23a to S23n). At this time, lighting devices 100a and 100d each record, as variation information, time-series data of a received signal strength at the time when the call signal is received (S22).

After the predetermined period of time has passed, lighting devices 100a and 100d each transmit the recorded variation information to radio device 200 (S24).

Radio device 200 judges whether or not the variation indicated by the variation information of each of lighting devices 100a and 100d satisfies a predetermined condition (S14), determines as one of registration candidates and displays the lighting device when it is determined that the lighting device satisfies the predetermined condition (S15), and registers, as a lighting device to be controlled, a lighting device selected from among registration candidates (S16).

Here, the predetermined condition may be "the variation range being greater than the threshold value" or instead, may be "the variation range being greatest among lighting devices 100".

In this diagram, the variation range of lighting device 100d is greater than the threshold value or the variation range of lighting device 100d shows the greatest value, and thus lighting device 100d is determined to be, and displayed as, one of the registration candidates. The registration candidates are registered according to selection operations by a user.

In this manner, lighting device 100 of which the received signal strength has been varied by disturbance component 400 is determined to be one of the registration candidates, and thus it is possible to reduce erroneously registering other lighting devices 100.

It should be noted that the processing performed by radio device 200 may also be performed in the same manner by radio device 300. In this case, the processes of display and receiving of a user operation may be performed using radio device 200 as a UI of radio device 300.

In addition, as a precondition for Step S24 in FIG. 5, a request signal for requesting transmission of variation information may be transmitted from radio device 200 to each of lighting devices 100.

1.6 MODIFICATION EXAMPLES

Next, modification examples of disturbance component 400 and the registration method according to Embodiment 1 shall be described.

FIG. 6 is a diagram illustrating another example of disturbance component 400. Disturbance component 400 illustrated in the diagram includes a planar component displaceably attached to lighting device 100, and the planar component is a radio reflector or a radio absorber. According to the example illustrated in this diagram, a planar component displaceably attached to lighting device 100 means a planar component ditacheably attached to lighting device 100. In this case, disturbance component 400 causes the received signal strength to have a difference between before and after the planar component is detached. Disturbance component 400 described above can be used in work of installing lighting device 100 to a ceiling, for example.

It should be noted that, although disturbance component 400 is disposed on a lower side of lighting device 100 in FIG. 6, disturbance component 400 may be disposed on a longitudinal side of lighting device 100. In this case, disturbance component 400 may be pivotally disposed about an axis of a longitudinal lower side, instead of being detachably disposed. In this case, the received signal strength is varied by repeating pivot.

Figure 7:
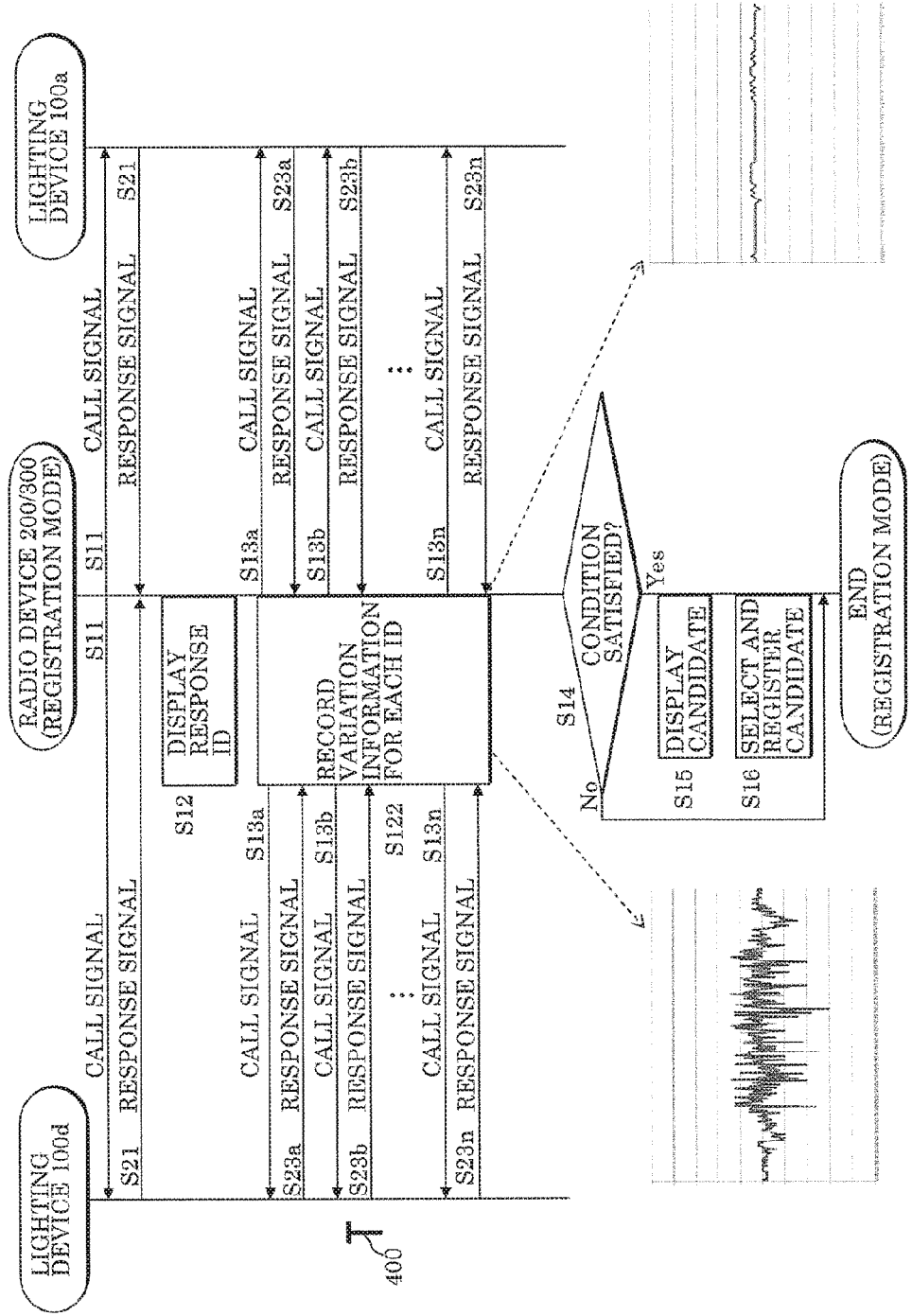
FIG. 7 is a sequence diagram illustrating a modification example of Embodiment 1.

FIG. 7 is a sequence diagram illustrating a modification example of the registration method according to Embodiment 1. This diagram is different from FIG. 5 in that Step S22 is deleted and Step S122 is added. The following description focuses on the differences.

Step S122 is a process of recording variation information for each ID performed by radio device 200, in place of Step S22 performed for each lighting device 100. Specifically, radio device 200 records, for each of the IDs of lighting devices 100, a received signal strength when a response signal is received, as time-series data. Radio device 200 ultimately determines the time-series data as variation information for each of the IDs.

In FIG. 5, radio device 200 obtains variation information for each of lighting devices 100, by receiving the variation information from each of lighting devices 100. In contrast, in FIG. 7, radio device 200 obtains variation information for each of lighting devices 100, by generating the variation information based on the received signal strength of a response signal from each of lighting devices 100.

It should be noted that the processing performed by radio device 200 in FIG. 7 may also be performed in the same manner by radio device 300. In this case, the processes of display and receiving of a user operation may be performed using radio device 200 as a UI of radio device 300.

Embodiment 2

2.1 A CONFIGURATION EXAMPLE OF A LIGHTING SYSTEM

A configuration example of a lighting system according to Embodiment 2 may be the same as the configuration example illustrated in FIG. 1 and FIG. 2 according to Embodiment 1. Embodiment 2 is different from Embodiment 1 in that radio device 200, in the particular radio communication mode (registration mode), transmits one or more times a control signal for varying an operation state of lighting device 100, instead of the call signal, and in that the predetermined condition includes presence of a correlation between the above-described variation in the operation state and variation indicated in the variation information. The following description focuses on the differences.

The above-described variation in the operation state is, for example, at least one of (a) varying brightness at a rate perceivable to human, (b) varying a color temperature at a rate perceivable to human, and (c) varying a sound at a rate perceivable to human. In other words, the above-described control signal instructs lighting device 100 at least one of (a) to (c).

The operation state is varied as described above in order to inform a user or an installation worker of when to vary the position of disturbance component 400 up and down. In other words, when variation in the received signal strength caused by disturbance component 400 has a correlation with, or in synchronization with, the variation in the operation state, it is possible to more easily and more reliably determine the registration candidate of lighting device 100.

Figure 8:
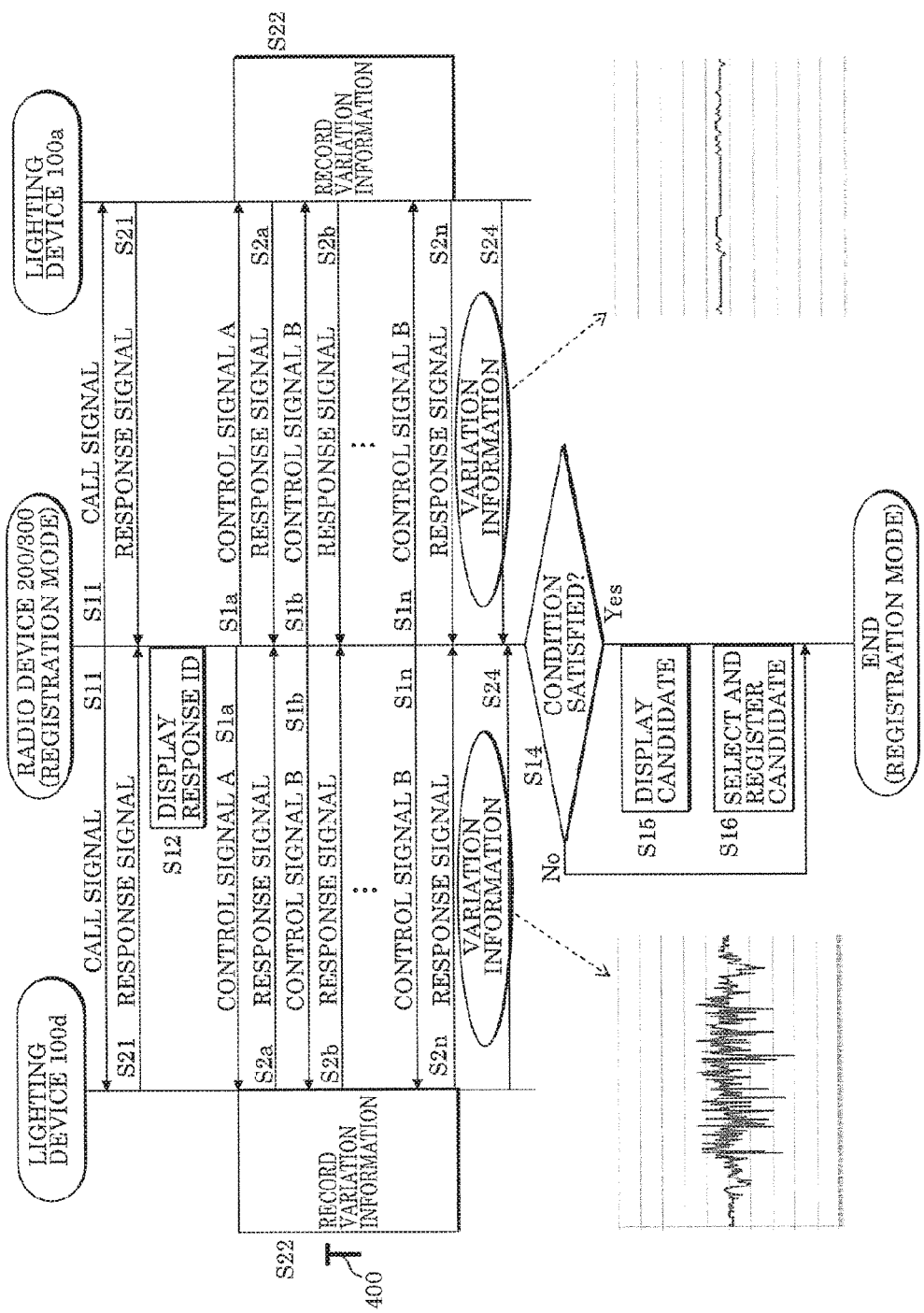
FIG. 8 is a sequence diagram illustrating a processing example in a registration mode according to embodiment 2.

FIG. 8 is a sequence diagram illustrating a processing example in a registration mode according to embodiment 2. This diagram is different from FIG. 5 in that Step S1a to Step S1n and Step S2a to Step S2n are performed instead of Step S13a to Step S13n and Step S23a to Step S23n. More specifically, this diagram is different from FIG. 5 in that lighting devices 100 transmit a control signal multiple times instead of repeatedly transmitting a call signal. In this diagram, in the case of the above-described (a), for example, control signal A is a signal indicating instruction to turn on, and control signal B is a signal indicating instruction to turn off. Control signals A and B are consecutively transmitted, and an interval of switching between control signals A and B is set to be an interval perceivable to human. In this manner, the operation states of lighting and not-lighting are varied at a rate perceivable to human. It is possible, with this variation in the operation state, to inform a user or an installation worker of when to vary the position of disturbance component 400 up and down.

Such variation in the operation state shall be described in detail with reference to FIG. 9 to FIG. 11.

Figure 9:
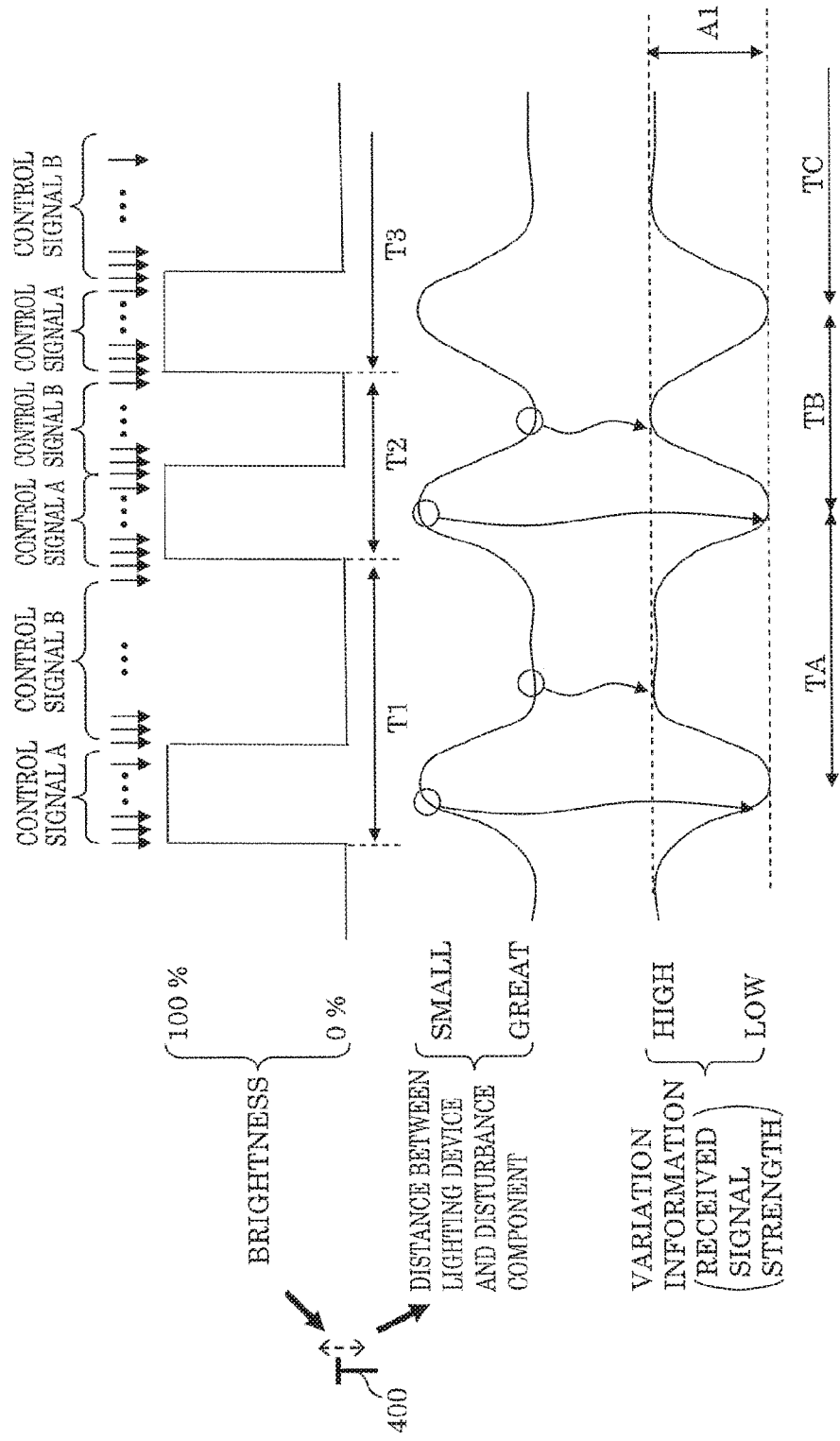
FIG. 9 is a diagram illustrating variation in brightness, variation in a position of the disturbance component, and variation in the received signal strength, in the registration mode.

FIG. 9 is a diagram illustrating variation in brightness, variation in a position of the disturbance component, and variation in the received signal strength, in the registration mode. Control signals A and B are transmitted as illustrated in the top stage of the diagram. In this manner, the operation state of lighting device 100 is varied to repeatedly switching between lighting and not-lighting at a rate perceivable to human.

A user or an installation worker moves disturbance component 400 according to the operation of lighting and not-lighting. In this diagram, disturbance component 400 is moved closer to lighting device 100 when lighting device 100 is turned on, and moved away from lighting device 100 when lighting device 100 is turned off.

The received signal strength varies according to the variation in the position of disturbance component 400. More specifically, as indicated by the variation information illustrated in the diagram, the received signal strength decreases as disturbance component 400 moves closer to lighting device 100, and increases as disturbance component 400 moves away from lighting device 100.

In this case, the predetermined condition of Step S14 illustrated in FIG. 8 may be "presence of correlation between variation in the operation state and variation indicated by variation information". In addition, the predetermined condition may relate to the number of times or a cycle of variation.

In this manner, it is possible to determine a registration candidate of lighting device 100 more easily and more reliably.

Figure 10:
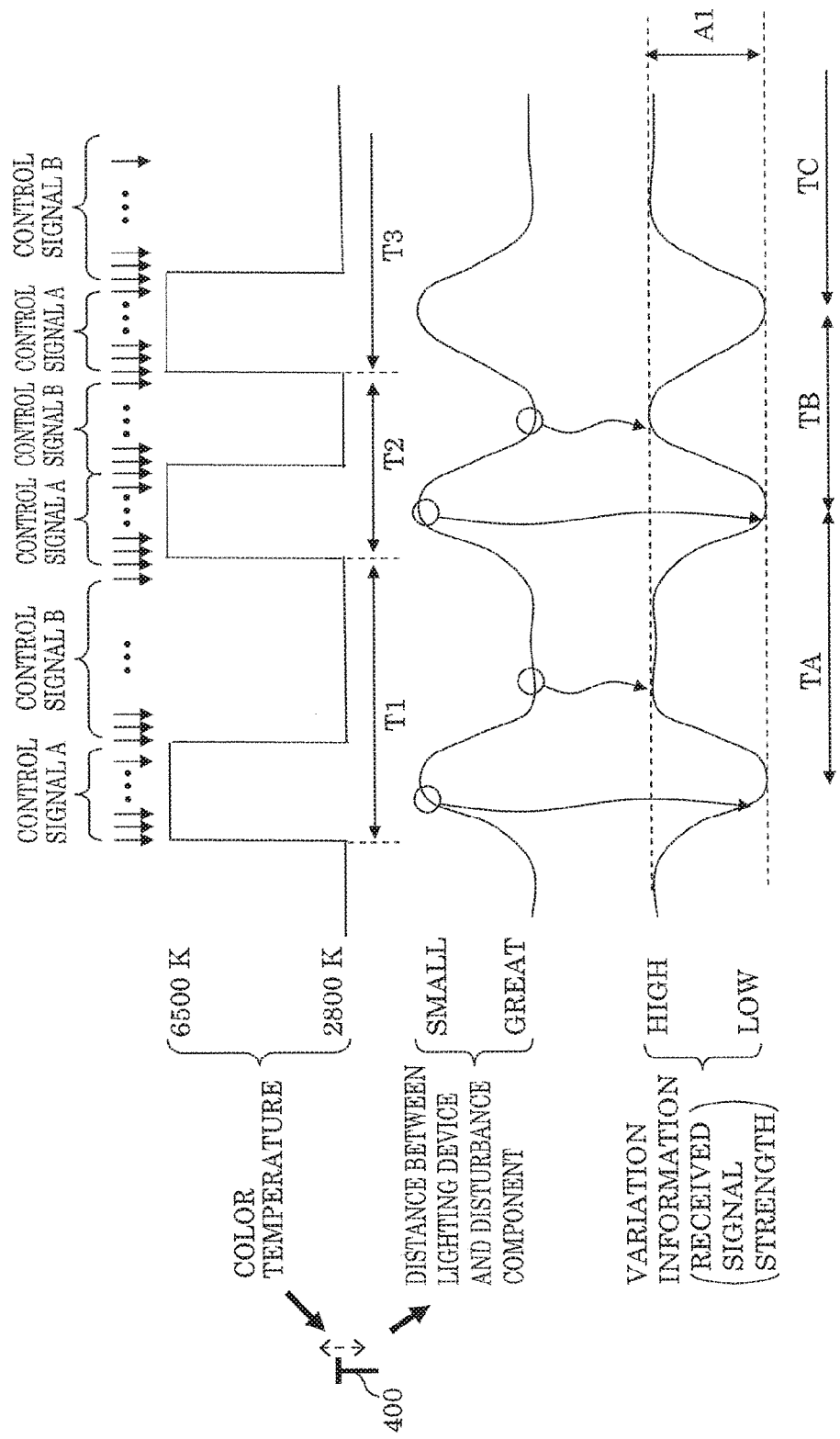
FIG. 10 is a diagram illustrating variation in color temperatures, variation in a position of the disturbance component, and variation in the received signal strength, in the registration mode.

FIG. 10 is a diagram illustrating variation in color temperatures, variation in a position of the disturbance component, and variation in the received signal strength, in the registration mode. Details of instruction of control signals A and B are different between FIG. 10 and FIG. 9. More specifically, in FIG. 10, in the case of the above-described (b), control signal A is a signal indicating instruction to set the color temperature at 6500 K, and control signal B is a signal indicating instruction to set the color temperature at 2800 K. In this manner, the color temperature is varied between 6500 K and 2800 K at a rate perceivable to human.

Figure 11:
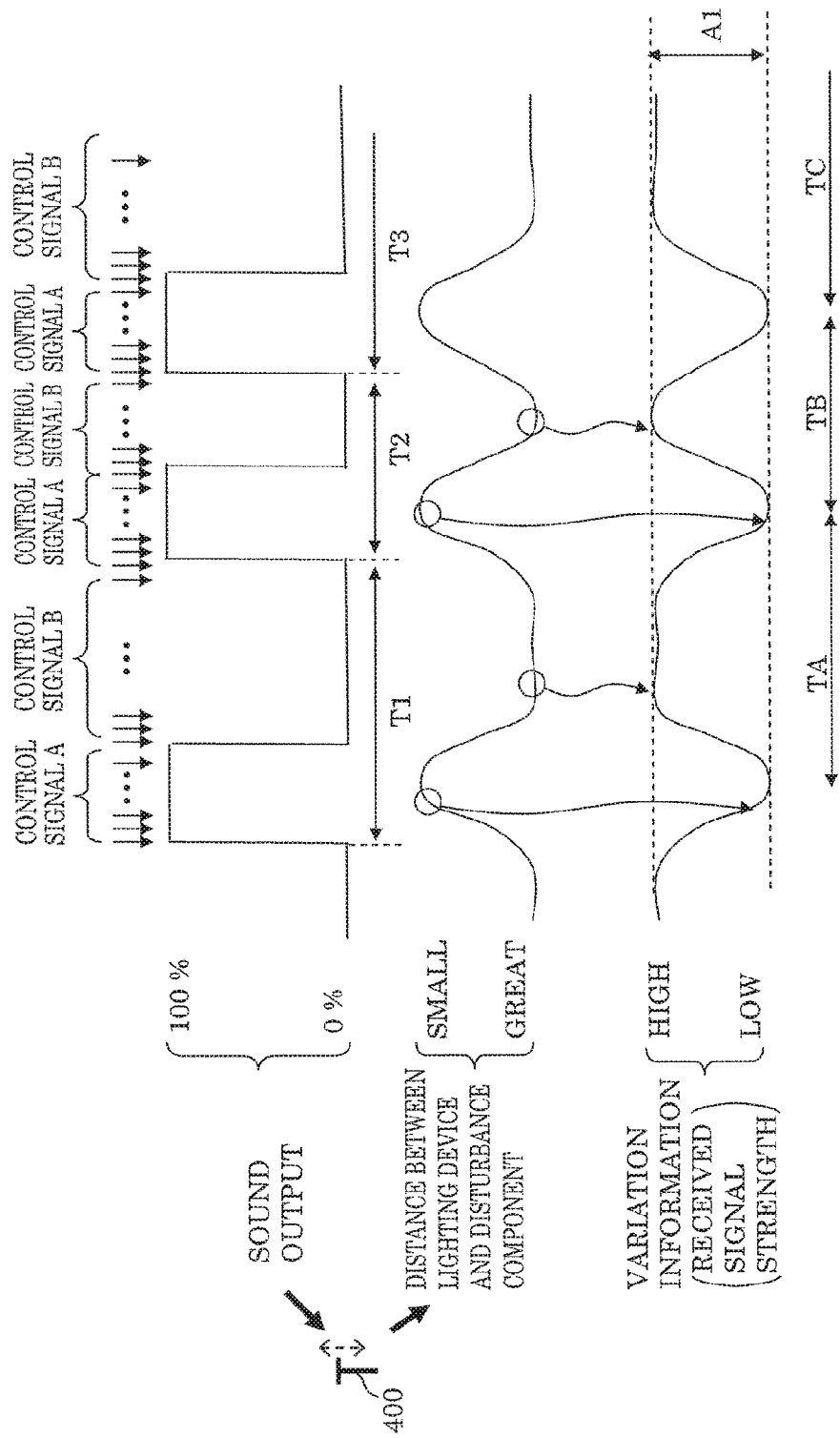
FIG. 11 is a diagram illustrating variation in a sound, variation in a position of the disturbance component, and variation in the received signal strength, in the registration mode.

FIG. 11 is a diagram illustrating variation in a sound, variation in a position of the disturbance component, and variation in the received signal strength, in the registration mode. Details of instruction of control signals A and B are different between FIG. 11 and FIG. 9. More specifically, in FIG. 11, in the case of the above-described (c), control signal A is a signal indicating instruction to output a sound from sound source 116, and control signal B is a signal indicating instruction not to output a sound from sound source 116. In this manner, presence or absence of outputting of a sound is varied at a rate perceivable to human.

In the manner as illustrated in each of FIG. 10 and FIG. 11, it is also possible to determine a registration candidate of lighting device 100 more easily and more reliably.

It should be noted that two or more of Steps S1a to 1n corresponding to FIG. 9 to FIG. 11 may be mixed. In other words, two or more of the above-described (a) to (c) may be mixed.

2.2 MODIFICATION EXAMPLES

Next, a modification example of the registration method according to Embodiment 2 shall be described.

FIG. 12 is a sequence diagram illustrating a modification example of Embodiment 2. This diagram is different from FIG. 8 in that Step S22 is deleted and Step S122 is added. The following description focuses on the differences.

Step S122 is a process of recording variation information for each ID performed by radio device 200, in place of Step S22 performed for each lighting device 100. This process has been explained in the description for FIG. 7.

In FIG. 12, radio device 200 obtains variation information for each of lighting devices 100, by receiving the variation information from each of lighting devices 100. In contrast, in FIG. 12, radio device 200 obtains variation information for each of lighting devices 100, by generating the variation information based on the received signal strength of a response signal from each of lighting devices 100.

It should be noted that the processing performed by radio device 200 in FIG. 12 may also be performed in the same manner by radio device 300. In this case, the processes of display and receiving of a user operation may be performed using radio device 200 as a UI of radio device 300.

2.3. OTHERS

With the radio-controlled lighting system, the radio device, and the registration method according to Embodiment 1 and Embodiment 2, it is possible to reduce erroneous registration when a lighting device to be controlled is registered.

As described above, the radio-controlled lighting system according to Embodiment 1 and Embodiment 2 includes: a plurality of lighting devices 100 each having a radio communication circuit; and radio device 200 (or 300) which controls the plurality of lighting devices 100 via radio communications. Radio device 200 (or 300) includes: obtainer 216 which obtains, for each of the plurality of lighting devices 100, variation information indicating variation in a received signal strength at either one of radio device 200 (or 300) and a corresponding one of the plurality of lighting devices 100, in a particular radio communication mode between plurality of lighting devices 100 and radio device 200 (or 300); judging component 217 which judges whether or not the variation indicated in the variation information satisfies a predetermined condition; determiner 218 which determines one or more of the plurality of lighting devices 100 to be one or more registration candidates when judging component 217 judges that the variation satisfies the predetermined condition; and register 219 which registers, as a target lighting device to be controlled, one of the plurality of lighting devices 100 which is selected from the registration candidates.

Here, radio device 200 (or 300) may be either one of controller 200 which controls the plurality of lighting devices 100 according to a user operation via the radio communications and relay 300 which relays, to the plurality of lighting devices 100, a radio signal transmitted from controller 200.

Here, the predetermined condition may relate to a variation range of the received signal strength.

Here, radio device 200 (or 300) may transmit one or more times a control signal for varying an operation state of the plurality of lighting devices 100, in the particular radio communication mode, and the predetermined condition may include presence of correlation between variation in the operation state and variation indicated by the variation information.

Here, the control signal may be for varying brightness at a rate perceivable to human.

Here, the control signal may be for varying a color temperature at a rate perceivable to human.

Here, the plurality of lighting devices 100 each may include sound source 116 which outputs a sound, and the control signal may be for varying the sound of sound source 116 at a rate perceivable to human.

Here, the radio-controlled lighting system may further include: planar component 410 including either one of a radio reflector and a radio absorber; and shaft 420 attached to planar component 410.

Here, the radio-controlled lighting system may further include a planar component displaceably attached to each of the plurality of lighting devices 100. The planar component may be either one of a radio reflector and a radio absorber.

Here, the plurality of lighting devices 100 may each generate the variation information in the particular radio communication mode, and transmit the variation information to radio device 200 (or 300), and obtainer 216 may obtain the variation information by receiving the variation information from the plurality of lighting devices 100.

Here, radio device 200 (or 300) may generate the variation information in the particular radio communication mode, and obtainer 216 may obtain the variation information generated.

In addition, the radio device according to Embodiment 1 and Embodiment 2 is radio device 200 (or 300) which controls a plurality of lighting device 100 via radio communications. Radio device 200 (or 300) includes: obtainer 216 which obtains, for each of the plurality of lighting devices 100, variation information indicating variation in a received signal strength at either one of radio device 200 (or 300) and a corresponding one of the plurality of lighting devices 100, in a particular radio communication mode between the plurality of lighting devices 100 and radio device 200 (or 300); judging component 217 which judges whether or not the variation indicated in the variation information satisfies a predetermined condition; determiner 218 which determines one or more of the plurality of lighting devices 100 to be one or more registration candidates when judging component 217 judges that the variation satisfies the predetermined condition; and register 219 which registers, as a target lighting device to be controlled, one of the plurality of lighting devices 100 which is selected from the registration candidates.

In addition, the registration method according to Embodiment 1 and Embodiment 2 is a method of registering, on radio device 200 (or 300), lighting device 100 to be controlled. The method includes: obtaining, for each of a plurality of lighting devices 100 including lighting device 100 to be controlled, variation information indicating variation in a received signal strength at either one of radio device 200 (or 300) and a corresponding one of the plurality of lighting devices 100, in a particular radio communication mode between the plurality of lighting devices 100 and radio device 200 (or 300); judging whether or not the variation indicated in the variation information satisfies a predetermined condition; determining one or more of the plurality of lighting devices 100 to be one or more registration candidates when it is judged that the variation satisfies the predetermined condition; and registering, as target lighting device 100 to be controlled, one of the plurality of lighting devices 100 which is selected from the registration candidates.

Although the radio-controlled lighting system, the radio device, and the registration method according to the present disclosure have been described on the basis of the above-described embodiments, the present disclosure is not limited to the above-described embodiments. Other forms in which various modifications apparent to those skilled in the art are applied to the present embodiment or forms in which some structural components according to the embodiments and modification examples are arbitrarily combined within the scope of the present discloser are also included within the scope of the present disclosure unless such changes and modifications depart from the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A radio-controlled lighting system, comprising:
   a plurality of lighting devices each having a radio communication circuit; and
   a radio device which controls the plurality of lighting devices via radio communications, wherein:
   the radio device includes:
      an obtainer which obtains, for each of the plurality of lighting devices, variation information indicating variation in a received signal strength at either one of the radio device and a corresponding one of the plurality of lighting devices, in a particular radio communication mode between the plurality of lighting devices and the radio device;
      a judging component which judges whether or not the variation indicated in the variation information satisfies a predetermined condition;
      a determiner which determines one or more of the plurality of lighting devices to be one or more registration candidates when the judging component judges that the variation satisfies the predetermined condition; and
      a register which registers, as a target lighting device to be controlled, one of the plurality of lighting devices which is selected from the registration candidates,
   the radio device transmits one or more times a control signal for varying an operation state of the plurality of lighting devices, in the particular radio communication mode, and
   the predetermined condition includes presence of correlation between variation in the operation state and variation indicated by the variation information.

2. The radio-controlled lighting system according to claim 1, wherein
   the radio device is either one of a controller which controls the plurality of lighting devices according to a user operation via the radio communications and a relay device which relays, to the plurality of lighting devices, a radio signal transmitted from the controller.

3. The radio-controlled lighting system according to claim 1, wherein
   the predetermined condition includes a variation range of the received signal strength.

4. The radio-controlled lighting system according to claim 1, wherein the control signal is for varying brightness at a rate perceivable to human.

5. The radio-controlled lighting system according to claim 1, wherein the control signal is for varying a color temperature at a rate perceivable to human.

6. The radio-controlled lighting system according to claim 1, wherein
   the plurality of lighting devices each include a sound source which outputs a sound, and
   the control signal is for varying the sound of the sound source at a rate perceivable to human.

7. The radio-controlled lighting system according to claim 1, further comprising:
   a planar component including either one of a radio reflector and a radio absorber; and
   a shaft attached to the planar component,
   wherein the variation in the received signal strength is caused by movement of the planar component.

8. The radio-controlled lighting system according to claim 1, further comprising
   a planar component displaceably attached to each of the plurality of lighting devices,
   wherein the planar component is either one of a radio reflector or a radio absorber, and
   the variation in the received signal strength is caused by movement of the planar component.

9. The radio-controlled lighting system according to claim 1, wherein the plurality of lighting devices each generate the variation information in the particular radio communication mode, and transmit the variation information to the radio device, and the obtainer obtains the variation information by receiving the variation information from the plurality of lighting devices.

10. The radio-controlled lighting system according to claim 1, wherein the radio device generates the variation information in the particular radio communication mode, and the obtainer obtains the variation information generated.

11. A radio device which controls a plurality of lighting devices via radio communications, the radio device comprising:

an obtainer which obtains, for each of the plurality of lighting devices, variation information indicating variation in a received signal strength at either one of the radio device and a corresponding one of the plurality of lighting devices, in a particular radio communication mode between the plurality of lighting devices and the radio device;

judging component which judges whether or not the variation indicated in the variation information satisfies a predetermined condition;

a determiner which determines one or more of the plurality of lighting devices to be one or more registration candidates when the judging component judges that the variation satisfies the predetermined condition; and a register which registers, as a target lighting device to be controlled, one of the plurality of lighting devices which is selected from the registration candidates, wherein:

the radio device transmits one or more times a control signal for varying an operation state of the plurality of lighting devices, in the particular radio communication mode, and the predetermined condition includes presence of correlation between variation in the operation state and variation indicated by the variation information.

12. A method of registering, on a radio device, a lighting device to be controlled, the method comprising:

obtaining, for each of a plurality of lighting devices including the lighting device to be controlled, variation information indicating variation in a received signal strength at either one of the radio device and a corresponding one of the plurality of lighting devices, in a particular radio communication mode between the plurality of lighting devices and the radio device;

judging whether or not the variation indicated in the variation information satisfies a predetermined condition;

determining one or more of the plurality of lighting devices to be one or more of registration candidates when it is judged that the variation satisfies the predetermined condition;

registering, as a target lighting device to be controlled, one of the plurality of lighting devices which is selected from the registration candidates; and disturbing one of the plurality of lighting device from wirelessly communicating with the radio device, thereby causing the variation in the received signal strength.

13. A method comprising:

receiving a plurality pieces of identification information from a plurality of lighting devices;

obtaining a plurality pieces of variation information indicating variation in a received signal strength with respect to wireless communications between a radio device and the plurality of lighting devices, respectively;

specifying a piece of identification information corresponding to one of the plurality of lighting devices, when the variation information with respect to the one of the plurality of lighting devices satisfies a predetermined condition, wherein:

a control signal for varying an operation state of the plurality of lighting devices is transmitted one or more times, in a particular radio communication mode, and the predetermined condition includes presence of correlation between variation in the operation state and variation indicated by the variation information.

14. A radio-controlled lighting system, comprising:

a plurality of lighting devices each having a radio communication circuit; and a radio device which controls the plurality of lighting devices via radio communications, wherein:

the radio device includes:

an obtainer which obtains, for each of the plurality of lighting devices, variation information indicating variation in a received signal strength at either one of the radio device and a corresponding one of the plurality of lighting devices, in a particular radio communication mode between the plurality of lighting devices and the radio device;

a judging component which judges whether or not the variation indicated in the variation information satisfies a predetermined condition;

a determiner which determines one or more of the plurality of lighting devices to be one or more registration candidates when the judging component judges that the variation satisfies the predetermined condition; and a register which registers, as a target lighting device to be controlled, one of the plurality of lighting devices which is selected from the registration candidates, and the predetermined condition is one of (i) a variation range of the received signal strength being greater than a threshold value and (ii) a variation range of the received signal strength being greatest among the plurality of lighting devices.

* * * * *